(12) United States Patent
Scroggie et al.

(10) Patent No.: US 8,020,354 B2
(45) Date of Patent: Sep. 20, 2011

(54) ROOF DITCH MOLDING RETAINER

(75) Inventors: Derek Scroggie, Macomb, MI (US); Robert Osterland, East China, MI (US); Aaron Jagoda, Richmond, MI (US)

(73) Assignee: Illinois Tools Works Inc., Glenview, IL (US)

( * ) Notice: Subject to any disclaimer, the term of this patent is extended or adjusted under 35 U.S.C. 154(b) by 269 days.

(21) Appl. No.: 12/266,844

(22) Filed: Nov. 7, 2008

(65) Prior Publication Data

US 2009/0188198 A1      Jul. 30, 2009

(51) Int. Cl.
*E04C 2/38* (2006.01)
(52) U.S. Cl. .................... 52/716.6; 52/716.2
(58) Field of Classification Search ............... 52/716.1, 52/716.2, 716.5, 716.7, 716.6
See application file for complete search history.

(56) References Cited

U.S. PATENT DOCUMENTS

| | | | | |
|---|---|---|---|---|
| 3,634,991 A * | 1/1972 | Barton et al. | | 52/716.7 |
| 3,943,610 A * | 3/1976 | Meyer | | 24/293 |
| 4,179,859 A * | 12/1979 | Fricko et al. | | 52/204.591 |
| 4,269,010 A * | 5/1981 | Glass | | 52/154 |
| 4,396,223 A * | 8/1983 | Drexel et al. | | 296/201 |
| 4,410,211 A * | 10/1983 | Kloppe et al. | | 296/213 |
| 4,930,279 A * | 6/1990 | Bart et al. | | 52/466 |
| 5,155,887 A * | 10/1992 | Stahl | | 24/297 |
| 5,353,571 A * | 10/1994 | Berdan et al. | | 52/716.5 |
| 5,413,398 A * | 5/1995 | Kim | | 296/210 |
| 5,829,825 A * | 11/1998 | Kim | | 296/210 |
| 6,557,931 B1 * | 5/2003 | Tremmel et al. | | 296/213 |
| 6,564,433 B2 * | 5/2003 | Nagasawa | | 24/297 |
| 6,944,917 B2 * | 9/2005 | Yanagita et al. | | 24/292 |
| 7,004,535 B1 * | 2/2006 | Osterberg et al. | | 296/203.03 |
| 7,029,060 B1 * | 4/2006 | Osterberg et al. | | 296/203.03 |
| 7,165,371 B2 * | 1/2007 | Yoyasu | | 52/716.5 |
| 7,407,224 B2 * | 8/2008 | Okabe et al. | | 296/210 |
| 7,641,250 B2 * | 1/2010 | Gambatese | | 296/1.08 |
| 2009/0021053 A1 * | 1/2009 | Harberts et al. | | 296/213 |
| 2011/0010898 A1 * | 1/2011 | Scroggie et al. | | 24/292 |

* cited by examiner

*Primary Examiner* — Robert Canfield
*Assistant Examiner* — Brent W Herring
(74) *Attorney, Agent, or Firm* — Mark W. Croll; Paul F. Donovan (57) ABSTRACT

A molding retainer is provided for securing a molding to a return flange in a roof ditch. The retainer generally includes a throat, a stop, a molding seat and a molding clip. In the case of a discontinuous flange having individual flange coupons, the throat may define a through-hole that fits over each flange coupon. The throat may include a plurality of fingers adapted to snap fit into windows in the flange coupons, with the fingers being mounted at different heights to accommodate variations in the placement of the windows. In the case of a continuous flange, the throat may define a channel that fits over the flange. The stop engages the floor of the roof ditch to provide a reference point for the height of the molding, and the molding clip engages and holds the molding.

9 Claims, 8 Drawing Sheets

ROOF DITCH MOLDING RETAINER

BACKGROUND OF THE INVENTION

The present invention relates to retainers and more particularly to retainers for automotive molding.

It is common to use molding and other trim elements on automobiles and similar products. Moldings may be applied to cover joints, seams and other unappealing features, or they may be applied simply for aesthetic purposes. Because it is not always easy to attach molding directly to automobile body parts, molding is often attached using a specialized retainer. Retainers are often specially configured based on the particular application to mount to the automobile and to provide a secure mounting structure for the molding. In many cases, the retainer mounts to the automobile by pushing an attachment leg or clip through an aperture in a body panel. In other cases, the retainer must be mounted over a flange or other similar structure in the body panels.

A variety of automobiles now include a roof ditch that extends along a portion of the roof above the door(s). The roof ditch is typically defined by the joint between the roof and the side panel of the automobile. Typically, the roof ditch is covered at least in part by a roof ditch molding. In many applications, the roof ditch molding is secured in the roof ditch by a plurality of two-piece retainers that attach to weld studs disposed along the roof ditch channel. The use of a conventional two-piece retainer can cause increased manufacturing costs because it requires separate manufacturing equipment and separate manufacturing steps for the two pieces. Also, the use of a two-piece retainer can increase installation cost because the two pieces need to be separately installed.

SUMMARY OF THE INVENTION

The present invention provides a one-piece roof ditch retainer that mounts to a return flange in the roof ditch. The retainer is configured to retain the molding at a consistent height within the roof ditch regardless of variations in the height of the return flange. In one embodiment, the retainer includes ribs that bottom out in the roof ditch and retention arms that interconnect with the molding. As a result, the height of the molding is set by the floor of the roof ditch and not the height of the flange. This allows the retainer to provide consistent molding height regardless of variations in the height of the flange.

In one embodiment, the retainer is intended primarily for use with a continuous flange. In this embodiment, the retainer defines a U-shaped channel that is fitted onto the return flange. During installation, the retainer is pushed down onto the flange until the retainer bottoms out on the floor of the roof ditch.

In one embodiment, the retainer is intended primarily for use with a discontinuous flange. In this embodiment, the retainer defines a through hole that is fitted over a flange coupon. In this embodiment, the flange coupon can exceed the height of the retainer without interfering with proper positioning of the molding.

These and other objects, advantages, and features of the invention will be readily understood and appreciated by reference to the detailed description of the current embodiment and the drawings.

DESCRIPTION OF THE CURRENT EMBODIMENT

I. Overview

The present invention is described in connection with various alternative embodiments. The illustrated retainers 10, 110 are intended primarily for use in retaining molding M in a roof ditch D. The retainers 10, 110 are configured to mount to a return flange F within the roof ditch D and to interfit with the molding M. In one embodiment, the retainer 110 is intended primarily for use with a roof ditch return flange F that extends along substantially the full length of the roof ditch. In another embodiment, the retainer 10 is intended primarily for use with a roof ditch flange F that is discontinuous, providing a plurality of separate short flange segments (or flange coupons C) spaced along the length of the roof ditch D. Directional terms, such as "up," "down," "bottom," "top," "vertical" and "horizontal," will be used herein to denote general directions with reference to the orientation of a typical, upwardly opening roof ditch (See FIG. 1). Although directional terms are used as an expedient, this should not be construed as limiting the present invention to any specific orientation.

II. General Structure

Figure 1:
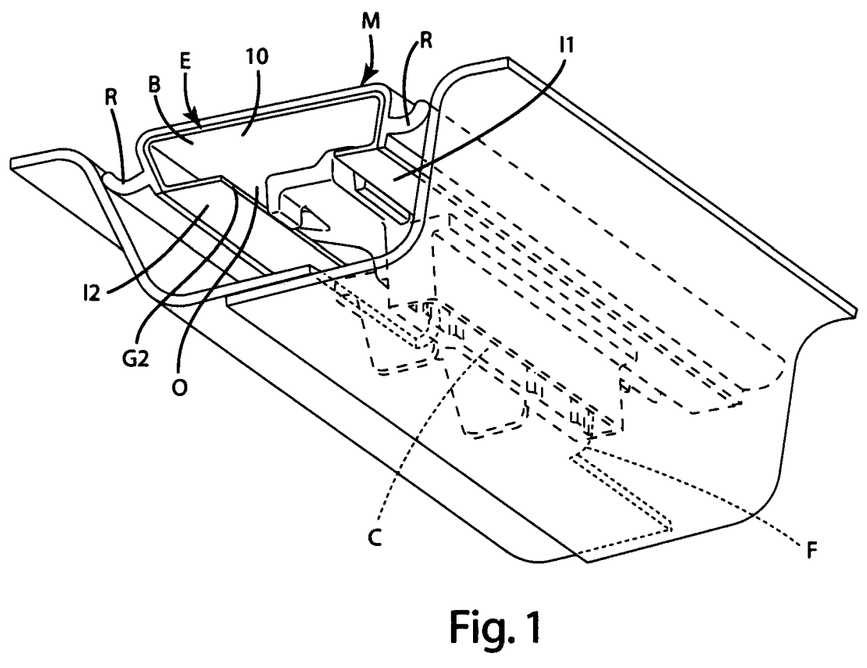
FIG. 1 is a perspective view showing an installed retainer in accordance with an embodiment of the present invention.
Figure 2:
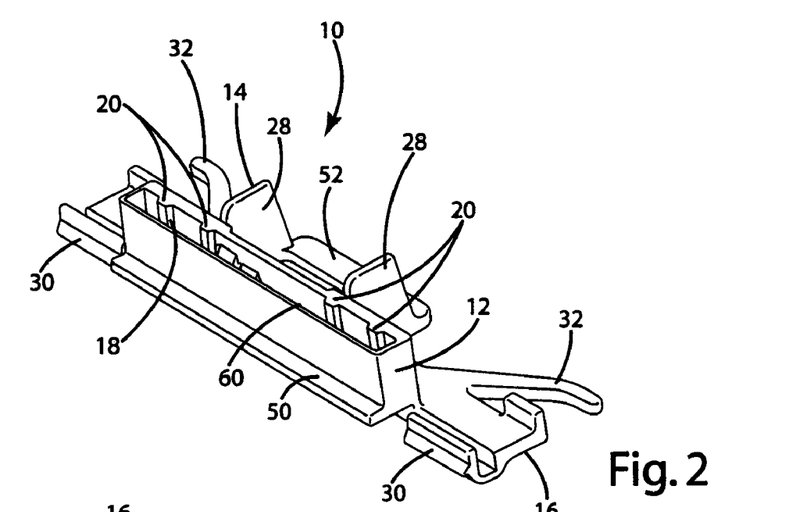
FIG. 2 is a bottom perspective view of the retainer.

FIG. 1 shows a roof ditch retainer 10 in accordance with the present invention installed within a roof ditch D and holding molding M. The roof ditch D includes a floor surface H. The molding M includes an outer molding part R and an inner molding part E, with an inner molding part bottom surface B. The inner molding part further includes two opposing flanges I1 and I2 that include two opposing inner surfaces G1 and G2, two top surfaces A, two bottom surfaces S, and an inner curved surface K.

The retainer 10 is shown in FIGS. 1-9 and 11-13. The illustrated retainer 10 is a one-piece retainer intended primarily for use in applications where the return flange F is discontinuous and is defined by a plurality of generally vertically protruding spaced flange coupons C.

Figure 10:
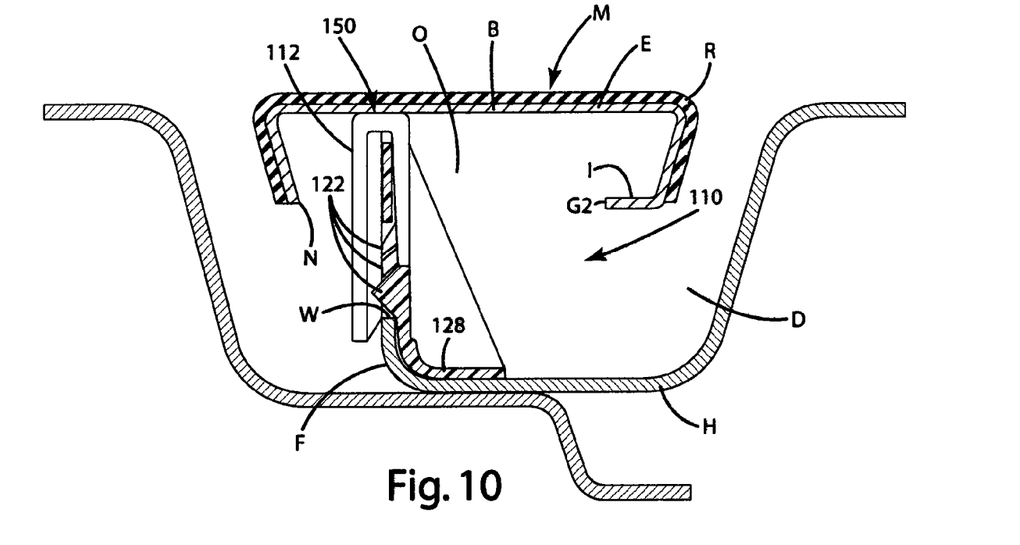
FIG. 10 is a sectional view of the second alternative retainer.
Figure 11:
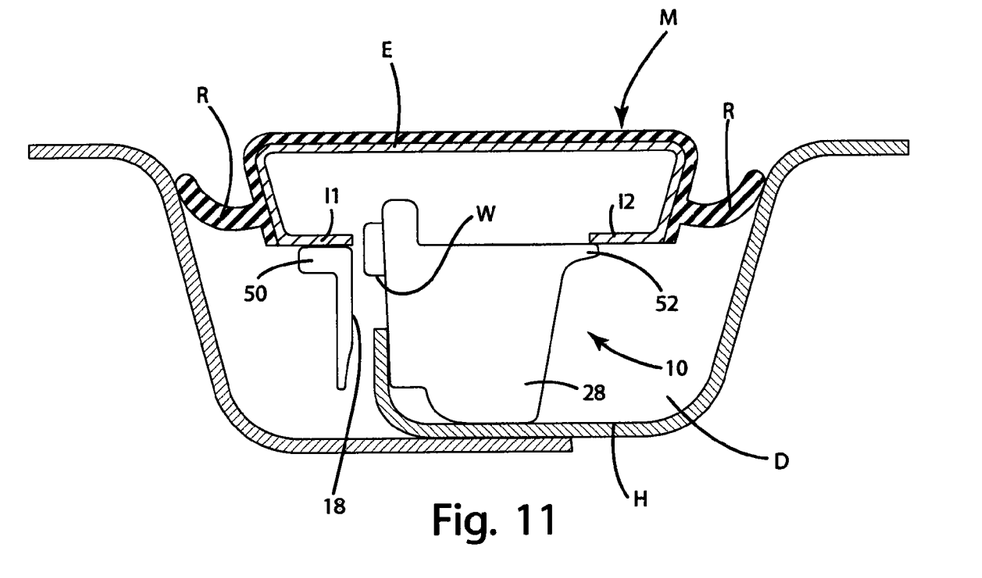
FIG. 11 is a sectional view of the installed retainer.
Figure 12:
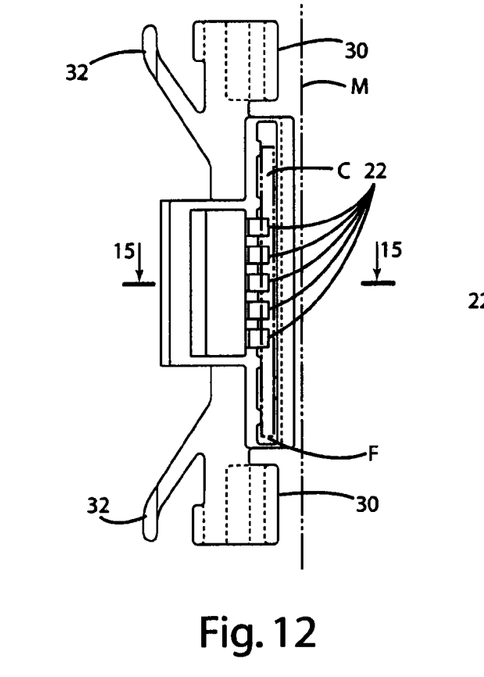
FIG. 12 is a top plan view of the retainer showing the flange coupon and molding.
Figure 13:
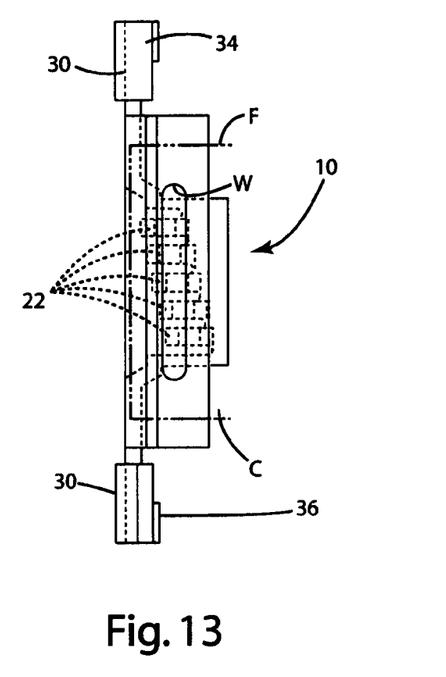
FIG. 13 is a right side elevational view of the retainer showing the flange coupon and molding.
Figures 14, 15:
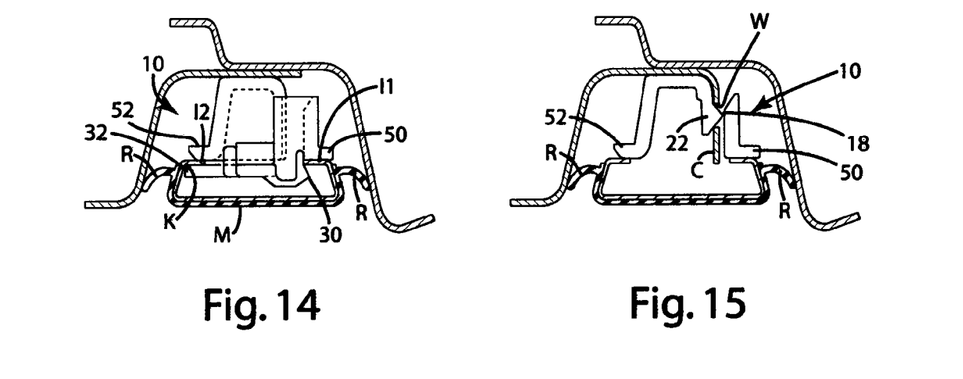
FIG. 14 is an inverted sectional view of the retainer showing the roof ditch and the molding.
FIG. 15 is an inverted sectional view of the retainer showing the roof ditch and the molding taken along line A-A of FIG. 12.
Figure 16:
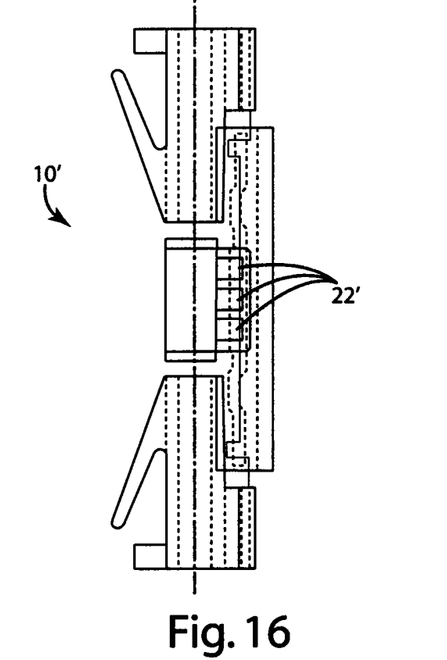
FIG. 16 is a top plan view of a first alternative retainer showing the flange coupon and molding.
Figure 17:
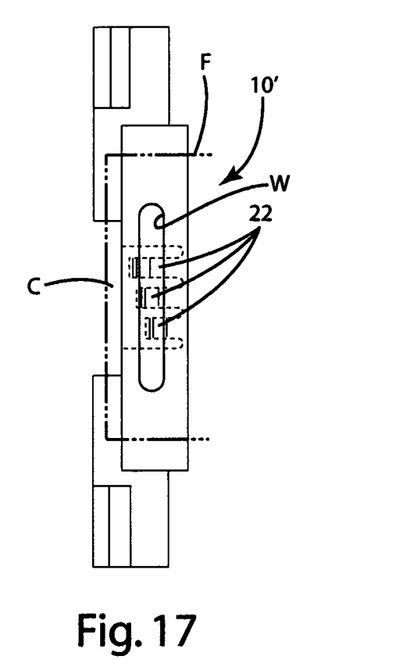
FIG. 17 is a right side elevational view of the first alternative retainer showing the flange coupon and molding.
Figure 18:
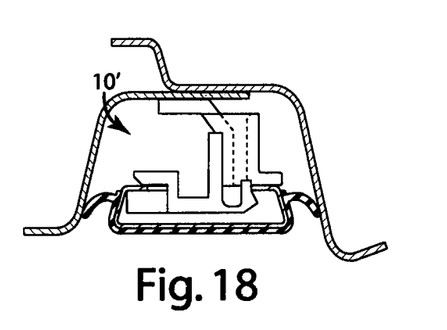
FIG. 18 is an inverted sectional view of the first alternative retainer showing the roof ditch and the molding.

The retainer 10 generally includes a throat 12, a stop 14, a molding seat 15 and a molding clip 16. The throat 12 may define an elongated material void in the form of a through-hole 18 or a channel 112 (See FIG. 10), configured to receive the flange F. In one illustrated embodiment, the throat 12 defines an elongated, generally vertically-extending though-hole 18 configured to fit over a return flange coupon C. In this configuration, the throat 12 surrounds the flange coupon C. The throat 12 may include internal ribs 20 to control the fit of the retainer 10 on the return flange coupon C. As shown, the retainer 10 includes four internal ribs 20 spaced along one side of the throat 12 (See FIGS. 2, 4 and 12). Internal ribs 20 could protrude from opposite sides of the throat 12, if desired. The size, location and number of internal ribs 20 may vary from application to application.

The throat 12 may include one or more fingers 22 to secure the retainer 10 on the flange coupon. The fingers 22 are adapted to snap fit within a corresponding flange window W defined in the flange coupon C. In the illustrated embodiment, the throat includes a plurality of fingers 22 that are arranged at different heights to provide a snap fit despite variation in the position of the window W. The position of the various fingers 22 with respect to the window W is perhaps best shown in FIG. 8. In applications where the window W is higher than the ideal location, a longer finger 22 will snap fit into the window W, and in applications where the window W is lower than the ideal location, a shorter finger 22 will snap fit into the window W. The shape of the end of each finger 22 can be designed to set the amount of force required to install and remove the retainer 10. The size, shape and number of fingers may vary from application to application. For example, FIGS. 16-19 show a first alternative retainer 10' having only three fingers 22'. The first alternative retainer 10' is otherwise essentially identical to retainer 10 and therefore will not be separately described in detail.

The stop 14 is configured to engage the floor H of the roof ditch D to provide a uniform reference point for the height of the molding M (See FIGS. 9, 11, 14 and 15). In the illustrated embodiment, the stop 14 includes a pair of ribs 28 extending substantially transversely to the extent of the throat 12. However, the stop ribs 28 may be replaced by essentially any structure suitable for engaging the floor H of the roof ditch D. If desired, the stop 14 and throat 12 can be configured to bottom out in the floor H of the roof ditch D at essentially the same time. The size, location and number of stop ribs may vary from application to application. Alternatively, the stop 14 may be integrated into the throat 12. For example, the stop 14 may be the bottom edge 60 of the throat 12 or may extend from the bottom edge 60 of the throat 12.

Figure 3:
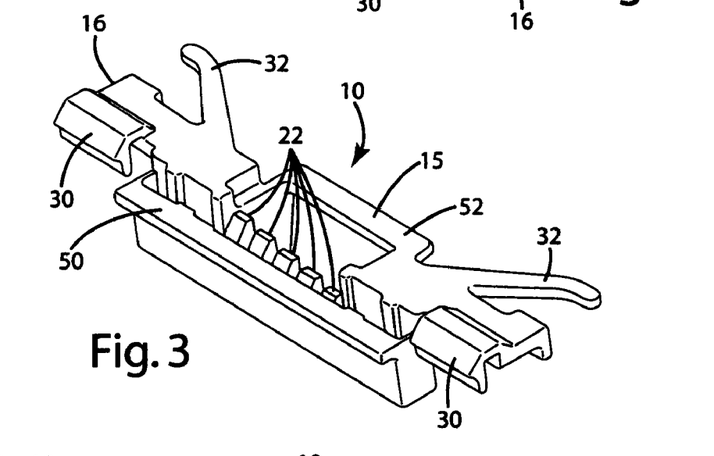
FIG. 3 is a top perspective view of the retainer.
Figure 4:
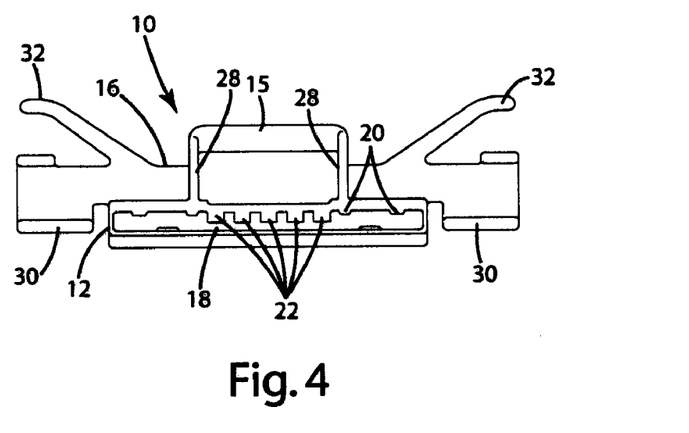
FIG. 4 is a bottom plan view of the retainer.
Figure 5:
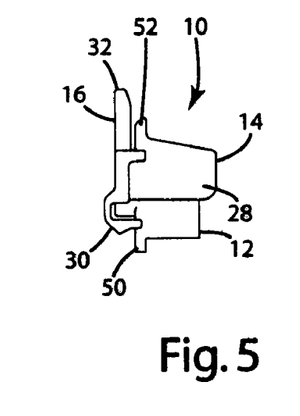
FIG. 5 is a left side elevational view of the retainer.
Figures 6, 7:
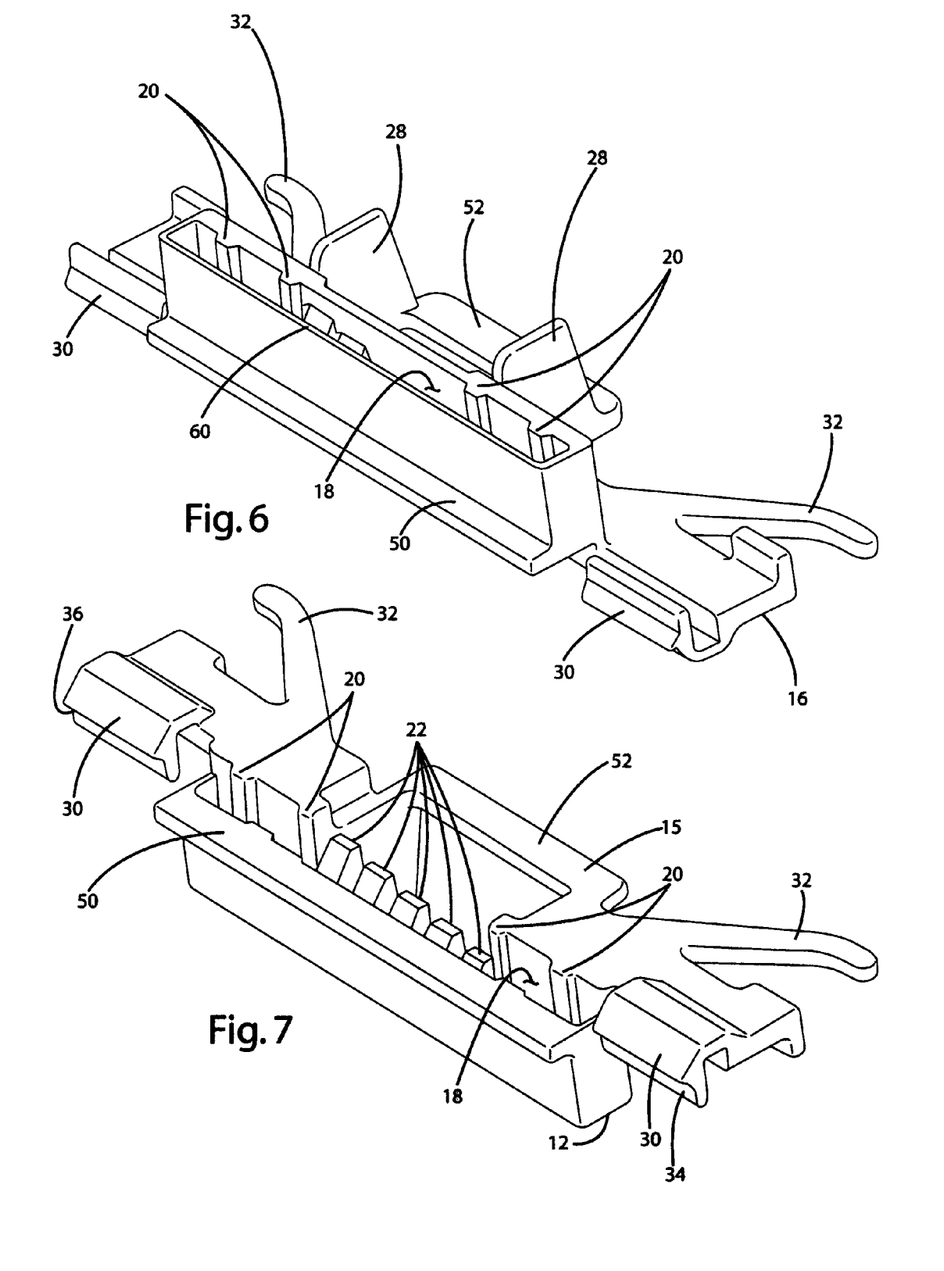
FIG. 6 is a bottom perspective view of the retainer.
FIG. 7 is a top perspective view of the retainer.
Figure 8:
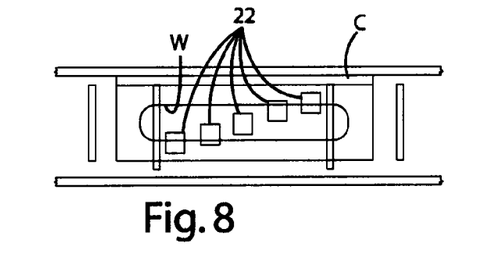
FIG. 8 is a representational view showing the retainer fingers and the flange coupon window.
Figure 19:
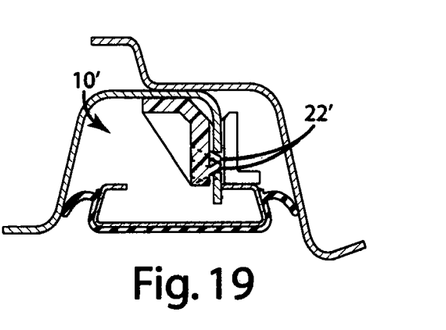
FIG. 19 is an inverted sectional view of the first alternative retainer showing the roof ditch and the molding taken along the centerline of FIG. 16.
Figure 20:
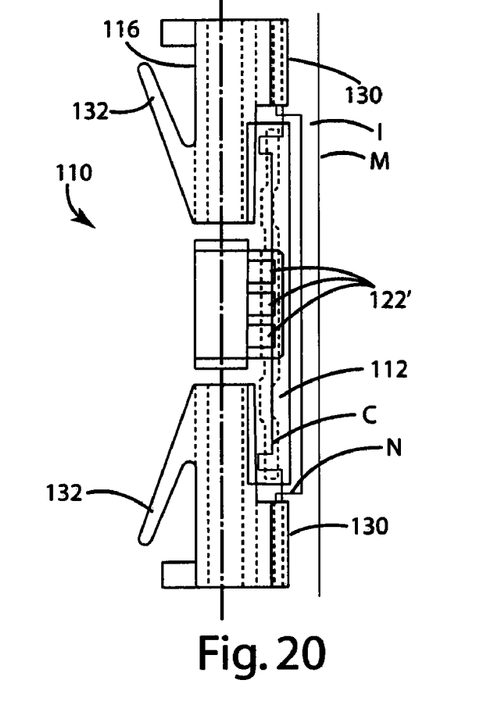
FIG. 20 is a top plan view of a second alternative retainer showing the flange coupon and molding.
Figure 21:
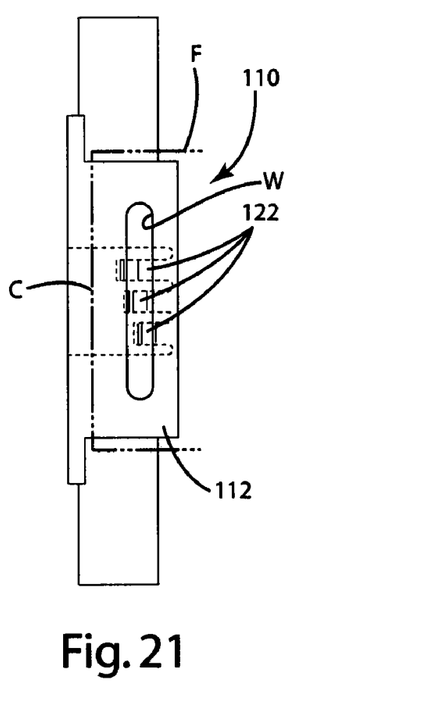
FIG. 21 is a right side elevational view of the second alternative retainer showing the flange coupon and molding.
Figure 22:
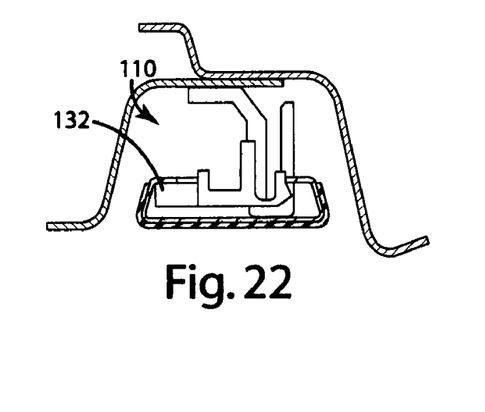
FIG. 22 is an inverted sectional view of the second alternative retainer showing the roof ditch and the molding.
Figure 23:
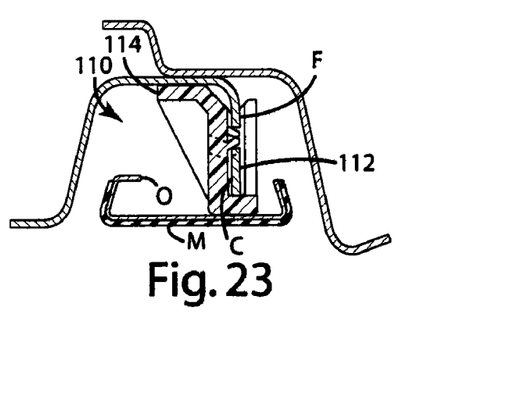
FIG. 23 is an inverted sectional view of the second alternative retainer showing the roof ditch and the molding taken along line the centerline of FIG. 20.

The molding seat 15 provides a surface against which the molding M may sit when installed on the retainer 10 (See FIGS. 9, 11, 14 and 15). Referring now to FIG. 3, the retainer molding seat 15 includes pads 50 and 52 that are substantially parallel to the opposing inner molding part flanges I1 and I2. In the illustrated embodiment, pad 50 extends from the upper edge of throat 12 and pad 52 extends between the top edges of stop ribs 28. Generally, the pads 50 and 52 engage the bottom surfaces S of the inner molding part flanges I1 and I2. The size, shape and configuration of the molding seat 15 may vary from application to application. In some applications, only one surface may be required for the molding seat, as shown in FIG. 19. In other applications, the molding seat may be incorporated into other elements of the retainer 10. For example, in some applications, the upper end of the throat 12 and/or the upper end of the stop ribs 28 may function as the molding seat. When not necessary, the molding seat may be eliminated.

The molding clip 16 is configured to engage and securely hold the molding M. In the illustrated embodiment, the clip 16 includes a pair of catches 30 and a pair of wings 32. As shown, the catches 30 and wings 32 extend in opposite directions. The wings 32 are manufactured from a material that is sufficiently flexible to allow the wings 32 to flex during installation of the molding M on the clip 16. For example, in the illustrated embodiment, the wings 32 can be flexed inwardly so that the entire clip 16 is narrow enough to fit into the molding M through the mouth O. Once inside of the molding M, the wings 32 extend outwardly from the throat 12 and engage the top surface A and inner curved surface K of the inner molding part flange I2. The catches 30 engage the opposing inner molding part flange I1. The catch 30 includes surfaces 34 and 36. Surface 34 is parallel to and engages the inner surface G1 of the inner molding part flange I1. Surface 36 extends from surface 34 and forms a ramp that prevents inner surface G1 from moving above surface 34. Generally, inner surface G1 will locate itself at the intersection of surfaces 34 and 36. This engagement is perhaps best shown by FIG. 14. The design and configuration of the clip 16 may vary from application to application to match the corresponding molding M.

Figure 9:
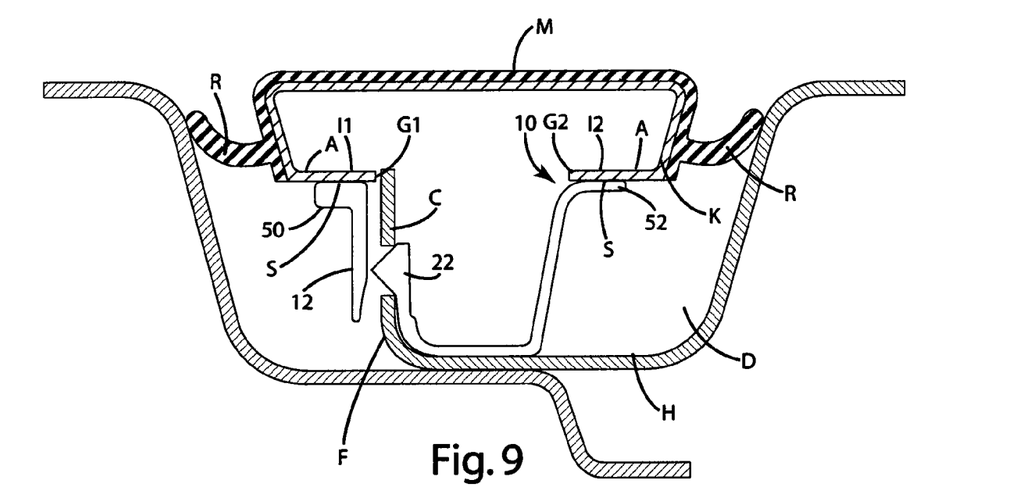
FIG. 9 is a sectional view of the installed retainer.

As perhaps best shown in FIG. 9, the flange coupon C may extend entirely through the throat 12 without causing misalignment of the retainer 10 and the molding M. This helps the retainer 10 to function properly even if the height of the flange varies along its length within certain tolerances.

FIGS. 10 and 20-23 show an alternative retainer 110. Although illustrated in connection with a discontinuous flange, this alternative retainer 110 is also well-suited for use with a continuous return flange. In this embodiment, the retainer 110 generally includes a throat that defines a channel 112. A stop 114 and a molding clip 116 are also included in this embodiment. The channel 112 opens generally downwardly to fit over a generally vertically protruding flange F. The channel 112 has open ends that permit the retainer 110 to be used with a continuous flange F. The depth of the channel 112 can be selected to accommodate variations in the height of the flange F. Although this provides some tolerance in the height of the flange F, a flange F of excessive height may prevent the retainer 110 from seating properly on the floor H of the roof ditch D. In the illustrated embodiment, the height of the flange F is controlled to correspond with the depth of the channel 112. As a result the flange F bottoms out within the channel 112 at essentially the same time that the stop 114 bottoms out within the roof ditch D.

As with retainer 10, the channel 112 may include one or more fingers 122 to secure the retainer 110 on the flange or flange coupon. The fingers 122 are adapted to snap fit within a corresponding window W defined in the flange. The channel 112 may include a plurality of fingers 122 arranged at different heights to provide a snap fit despite variation in the position of the window W, as described above in connection with retainer 10. The top surface 150 of the channel 112 may also function as a seat for the molding M. As perhaps best shown in FIGS. 10, 22 and 23, the channel 112 and molding clip 116 (described below) may be configured so that that the top surface 150 of the channel 112 directly engages the bottom surface B of the inner molding part E.

Stop 114, like stop 14, is configured to engage the floor of the roof ditch D to function as a reference for the height of the molding M. In the illustrated embodiment, the stop 114 is a longitudinally extending tab 128. It may, however, have essentially any size, shape or configuration capable of providing a suitable reference with the floor H of the roof ditch D.

The molding clip 116 is generally identical to the molding clip 16 discussed above. In general, the molding clip 116 of this embodiment includes a pair of catches 130 and a pair of wings 132. The catches 130 and wings 132 extend in opposite directions. The wings 132 are flexible enough to bend inwardly a sufficient distance for the entire clip 116 to fit into the molding M through the mouth O. The catches 130 are generally identical to the catches 30 described above. As with molding clip 16, the design and configuration of the molding clip 116 may vary from application to application to match the corresponding molding M.

With retainer 110, it may be desirable to notch the molding M to accommodate the retainer 110. For example, it may be desirable to define a small notch N in inner molding part flange I1 or I2 at each location where a retainer 110 is desired (See FIG. 10).

The retainer 10, 110 is typically one piece and may be manufactured using any suitable manufacturing techniques and apparatus. For example, the retainer 10, 110 may be injection molded, if desired. Although the retainer 10, 110 is typically one piece, it can be assembled from multiple parts, if desired. The retainer 10, 110 may be manufactured from essentially any material with suitable strength and flexibility. Acetal and Nylon have proven suitable for the manufacture of the retainer 10, 110.

The above description is that of the current embodiment of the invention. Various alterations and changes can be made without departing from the spirit and broader aspects of the invention.

The embodiments of the invention in which an exclusive property or privilege is claimed are defined as follows:

1. A molding retainer for securing a molding to a flange including:
   a throat adapted to receive the flange;
   a stop disposed on the molding retainer;
   a molding seat supporting the molding;
   a molding attachment structure; and
   a variable height attachment structure comprising a plurality of fingers disposed at differing operative heights within the throat, the fingers including upper and lower converging ramp surfaces and being adapted to snap fit in reversible relation within a flange window defined by the flange.

2. The molding retainer of claim 1 wherein the throat includes at least two internal ribs.

3. The molding retainer of claim 1 wherein the flange is discontinuous and consists of a plurality of flange coupons
   wherein the throat defines a through hole that surrounds an individual flange coupon.

4. The molding retainer of claim 1 wherein the throat defines a channel that fits over the flange.

5. The molding retainer of claim 4 wherein the channel has a top surface and the molding includes an inner molding part, the inner molding part having a bottom surface;
   wherein the top surface of the channel engages the bottom surface of the inner molding part.

6. The molding retainer of claim 1 wherein the stop includes a plurality of ribs extending substantially transversely to the extent of the throat.

7. The molding retainer of claim 1 wherein the molding attachment structure includes a plurality of catches and wings, the wings adapted to flex during insertion of the molding retainer into the molding.

8. A molding retainer system including:
   a flange;
   a molding wherein the molding includes a first flange, a second opposing flange, a first inner surface on the first molding flange, and a second inner surface on the second molding flange;
   a throat defining an elongated material void configured to receive the flange;
   a molding seat, including at least one surface that engages at least one of the first molding flange and the second molding flange;
   a molding attachment structure, including a pair of flexible catches and a pair of flexible wings, the catches engaging the first molding flange and the wings engaging the second opposing molding flange; and
   a variable height attachment structure, wherein the variable height attachment structure includes a plurality of fingers, each finger arranged at a different height in relation to a flange window defined by the flange, wherein each finger is adapted to snap fit in reversible relation within the flange window.

9. A molding retainer for securing a molding to a return flange extending from the floor of a roof ditch comprising:
   a molding, including a first molding flange and a second opposing molding flange, each molding flange having a top surface, an inner surface, and a bottom surface:
   a throat defining an elongated material void configured to fit over the flange;
   a stop on the molding retainer that engages the floor of the roof ditch;
   a molding seat consisting of a pair of surfaces substantially parallel to the molding flanges, the molding seat surfaces engaging the molding flanges; and
   a molding attachment structure including a plurality of wings and a plurality of catches, the plurality of wings extending outwardly from the throat, the wings engaging both the top surface and the inner surface of the first molding flange, the plurality of catches opposing the wings to engage the second opposing molding flange, wherein the throat has a bottom edge, and a plurality of fingers are located at varying distances from the bottom edge of the throat, the fingers including upper and lower converging ramp surfaces and being adapted to snap fit in reversible relation within a flange window defined by the flange.

* * * * *